United States Patent [19]
Gromala et al.

[11] Patent Number: 5,533,349
[45] Date of Patent: Jul. 9, 1996

[54] DETERMINATION OF AMBIENT AIR TEMPERATURE OUTSIDE OF AN APPLIANCE

[75] Inventors: Joseph R. Gromala, Roselle; Yu T. Nguyen, Glendale Heights, both of Ill.

[73] Assignee: Robertshaw Controls Company, Richmond, Va.

[21] Appl. No.: 357,931

[22] Filed: Dec. 16, 1994

[51] Int. Cl.$^6$ .................................... G05D 23/00
[52] U.S. Cl. ........................... 62/129; 62/214; 236/91 R
[58] Field of Search .......................... 62/125, 126, 127, 62/129, 229, 209, 214, 215, 157, 231, 130; 236/94, 91 R, 91 D; 165/11.1, 28; 374/134, 141, 159

[56] References Cited

U.S. PATENT DOCUMENTS

| | | | |
|---|---|---|---|
| 4,040,565 | 8/1977 | Christiansen | 236/91 R X |
| 4,089,462 | 5/1978 | Bradford | 236/91 R X |
| 4,407,141 | 10/1983 | Paddock | 62/130 |
| 4,495,780 | 1/1985 | Kaneko et al. | 62/209 X |
| 4,910,966 | 3/1990 | Levine et al. | 62/129 |
| 5,070,932 | 12/1991 | Vlasak | 236/91 G X |
| 5,197,670 | 3/1993 | Hanson et al. | 236/78 D |
| 5,263,335 | 11/1993 | Isono et al. | 62/209 X |
| 5,275,011 | 1/1994 | Hanson et al. | 236/91 R X |
| 5,293,755 | 3/1994 | Thomas | 236/91 R X |

*Primary Examiner*—Harry B. Tanner
*Attorney, Agent, or Firm*—Robert J. Black

[57] ABSTRACT

A method for determining ambient air temperature outside of an appliance by making measurements inside the appliance. By measuring the time it takes a sensor to change inside the appliance from one temperature reading to another reading, the ambient temperature changes can be determined. Using this information, appliance performance can be optimized.

12 Claims, 3 Drawing Sheets

DETERMINATION OF AMBIENT AIR TEMPERATURE OUTSIDE OF AN APPLIANCE

BACKGROUND OF THE INVENTION

1. Field of the Invention

The present invention relates to household appliances, and more particularly to cooling systems, such as those utilized in refrigerators, freezers, and air conditioners.

2. Background Art

In the usual operation of appliances, such as refrigerators, freezers, and air conditioners, the appliance includes a sensor inside which causes the initiation of the operation of a compressor based on preestablished consumer user settings (cooler or warmer) and a preset temperature associated with the setting established by the user. Normally the preset temperatures are the same for each user setting, independent of ambient temperatures in which the appliance is operated.

Accordingly, inaccuracies of temperature control or energy efficiency may occur when substantial variance occurs in the temperature of the ambient air. Normally, solutions to this problem have utilized an extra temperature sensor placed outside the appliance. In this arrangement, the outside temperature is detected by the extra temperature sensor is utilized to override or provide some additional control to the internal compressor or similar device.

A search of the background art directed to the subject matter of the present invention and conducted in the U.S. Patent and Trademark Office disclosed the following U.S. Letters Patent:

U.S. Pat. No. 5,293,755 pertains to a control system, including an outdoor temperature sensor for sensing outdoor temperatures outside of an enclosure to be temperature controlled and a second temperature sensor within the enclosure sensing the interior temperature. Differential circuitry provides appropriate adjustment or control.

U.S. Pat. No. 5,123,477 is a programmable temperature control for a thermal reactor. Here too, a first temperature sensor is included within the chamber. The second sensor is included to sense temperature of air supplied to the chamber. Computer monitoring of the sensors controls the temperature of the chamber as the result of information from both sensors, U.S. Pat. No. 5,275,011 teaches a method of operating a refrigeration system in two operating modes. The first mode determining a preselected temperature range is user selected, while the second mode monitors ambient temperature and a dynamic set point temperature to control an internal combustion engine which is utilized to control the compressor of the refrigeration system.

U.S. Pat. No. 5,197,670 is similar to U.S. Pat. No. 5,275,011. It teaches a refrigeration system having a compressor driven by a prime mover. The mover being started and stopped in response to the difference between the temperature of the conditioned space and a selected set point. Again, two temperature sensors are employed, one of which is included within the air flow.

U.S. Pat. No. 5,070,932 is a thermostat which utilizes a fixed resistor in series with an ambient compensating thermistor for temperature control purposes.

Based on a thorough review of the above identified patents, we believe that none of the above teach, disclose or claim the novel combination of elements and functions found in the improved cooling system taught by the present invention.

SUMMARY OF THE INVENTION

In the present invention, as in most appliances, the temperature inside of an enclosure needs to be controlled. Such enclosure might very well be part of a refrigerator, freezer or air conditioner. Normally, this desired temperature within the enclosure is less than the temperature outside the enclosure. In the usual arrangement, a device such as a compressor generates a cold temperature, which is conducted inside the enclosure. A first temperature sensing device is placed inside the enclosure to cause the compressor to turn on and off in order that the desired temperature is achieved and maintained. It is understood that the enclosure is usually a normally closed system, such as a refrigerator, freezer, etc.

The sensor, or sensing device, causes the compressor to turn on and off between two temperatures, so that the temperature inside the enclosure is at the average desired temperature. When the compressor is on, it causes the temperature to drop. When it is off, the temperature rises inside the enclosure. The temperature of the enclosure attempts to rise to the outside or ambient temperature. The time it takes for the temperature to rise and fall between the two temperatures is a constant, as long as the outside temperature remains constant.

However, it has been determined that other factors frequently cause the temperature to rise or fall, such as a door on the enclosure being opened for a short time, letting in warmer or colder air. Also, the amount of mass of warm or cold objects placed within the enclosure may also cause a change. Such factors are usually accounted for by sensing door opens, or recognizing a change in the time-temperature curve that normally happens in a sealed system. It is also understood that breakdowns of the compressor system are ignored as a possible temperature varying factor for the purposes of the present invention.

Within the purview of the teachings of the present invention, to get the constant rise and fall times which correlate to outside temperature, initial testing is performed and data is collected on the enclosure under varying outside temperature conditions. Testing may also be performed to account for other factors, such as different mass, warm or cold objects and opening of the enclosure door. Since it has been determined that the time it takes for the compressor to turn on (followed by a fall time) and off (followed by a rise time) will vary and correlate to outside temperatures. When outside temperatures are warmer than normal, the time for a fall in temperature will increase, and the time for a rise in temperature will decrease. However, if the outside temperature is determined as being colder, than the opposite results occur. It has been determined that a minimum of two outside temperatures are required to obtain the initial reference times. The initial conditions only help to get more accurate outside temperatures.

In the present invention, a device such as a microcontroller is utilized to monitor the operation of the compressor in the usual manner based on readings of the sensor. Initial reference times are stored in the microcontroller. The microcontroller keeps track of the times it takes for the inside temperatures to change between the turn on and turn off temperatures. It can also determine the slope temperature between the turn on and turn off temperatures. The present time conditions are then compared to reference times to calculate the temperature outside the enclosure. With this information, the operation of the compressor may be adjusted based on the estimated or concluded outside temperature.

Appropriate adjustments may be made to reduce temperature variation, improve temperature control, and predict other items or reduce energy usage of the appliance.

It has been found that the time it takes for the temperature to rise or fall between the on and off temperatures may or may not be equal in time. Inasmuch as the rise time, or the fall time, can be used to sense differences in outside temperature, the utilization of both times allows for more information or higher accuracy. Rate of change in rise or fall or the slope may also be used to detect variances in ambient temperatures.

By measuring the time to get to an intermediate temperature point between two temperatures, the same or extra information is obtainable. This information could be utilized to detect door openings on the enclosure, or the presence of warmer or colder items placed within the enclosure. The desired temperature may be adjusted and changed. In this case, the microcontroller would adjust the reference times based on initial data or can make small shifts in reference values so that outside temperatures may still be detected.

Accordingly, in conclusion if there are two desired temperatures, the microcontroller can recognize these settings and have two different groups of reference times. Since the outside temperature affects the inside temperature on the differential between the two temperatures, reference times can be different for each setting. An alternative way to measure the outside temperature is by making measurements of changes in temperature using a fixed time reference.

It has been determined that other factors which would allow for the outside temperature to be estimated or measured include the following:

The user may also be able to change the two temperatures which derive the average temperature.

More than one sensor could be used.

Combinations of consecutive or non-consecutive time or temperature measurements could be utilized.

Actual rise or fall times are not necessarily needed, merely percentages of rise or fall time will work.

It is also possible that the teachings of the present invention could be utilized for heating appliances. The desired temperature inside the enclosure being greater than the outside temperature. A device inside would be used to generate heat rather than cold.

It would also be possible to utilize the enclosure having multiple compartments with the sensor placed anywhere inside t he compartment,

BRIEF DESCRIPTION OF THE DRAWINGS

A better understanding of the present invention may be had from consideration of the following detailed description taken in conjunction with the following drawings.

DESCRIPTION OF THE PREFERRED EMBODIMENT

For a better and more thorough understanding of the present invention, it will be shown embodied in a refrigerator for purposes of illustration. It must be understood, however, that the invention is not limited to the use solely in refrigerators, but in other appliances, such as freezers, air conditioners, etc.

Figure 1:
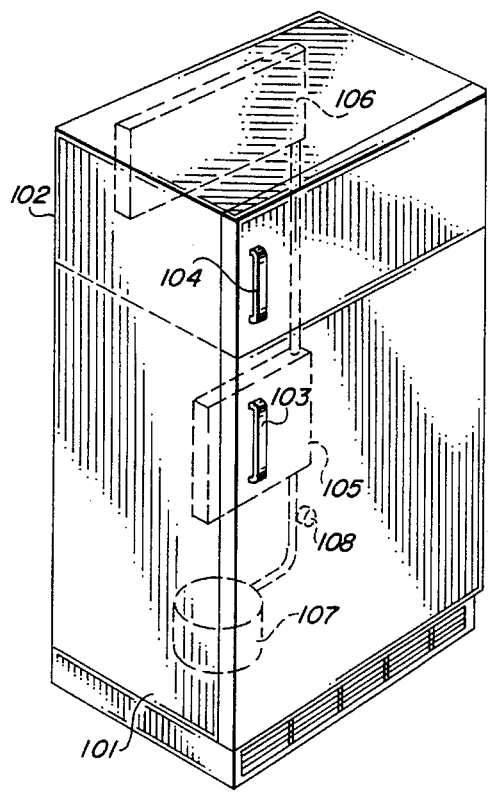
FIG. 1 is an isometric sketch of a refrigerator or similar device employing the teachings of the present invention.

As shown in FIG. 1, a temperature sensor 108 is used to detect temperatures which change over an extended period of time. Sensor 108 is placed inside of a refrigerator section 101 of a typical refrigerator, as shown in FIG. 1, which includes a door having a handle 103 and a device inside, i.e., the compressor 107 which generates cold temperatures. The temperature sensor 108 controls the compressor in a well known manner to periodically operate the compressor so that the inside of the refrigerator, when the door is closed, is regulated at an average temperature, as determined by the user. A microcontroller, or some other similar measuring device, (not shown) included within the refrigerator measures the time it takes for the sensor temperature to rise and fall, Assuming that the refrigerator is placed in a room which has a controlled temperature of 25° C., the inside of the refrigerator is set by the user to operate at 0° C., The microcontroller measures the on (t2) and off (t1) times as shown in FIG, 2 of the cold operating device compressor 107 to provide operation at 0° C., At this time, the external or room temperature may be changed to 32° C. Again, times can be measured for internal refrigerator setting of 0° C.

Figure 3:
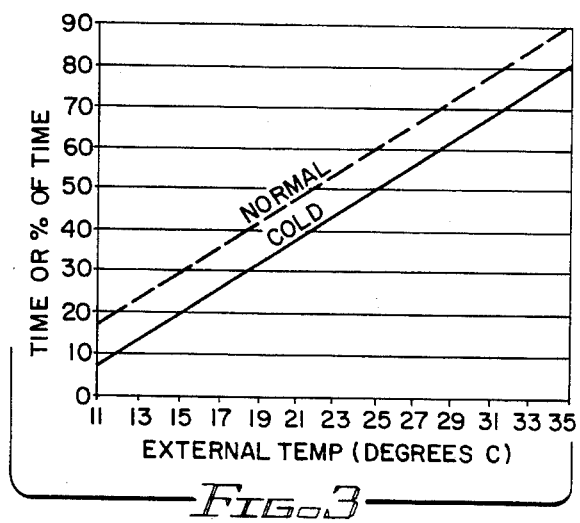
FIG. 3 is a graph indicating the inside timers external temperatures at two different settings.
Figure 4:
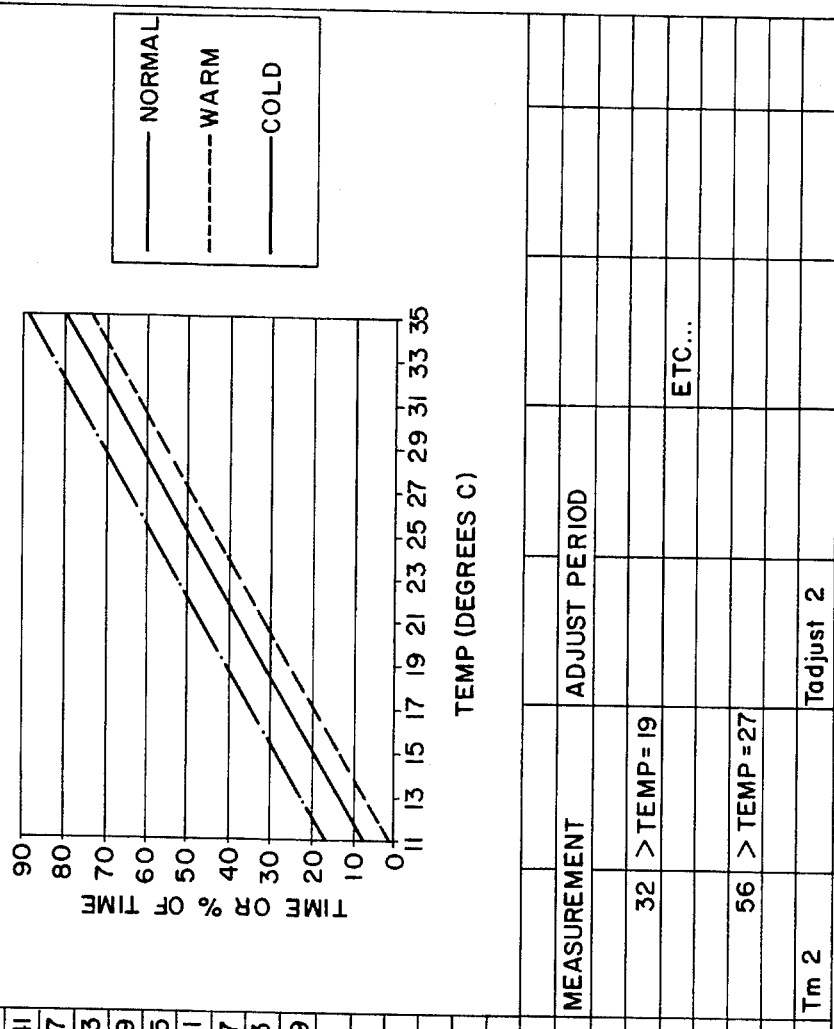
FIG. 4 is a table showing on or off times in minutes or percentage of operation.
Figure 6:
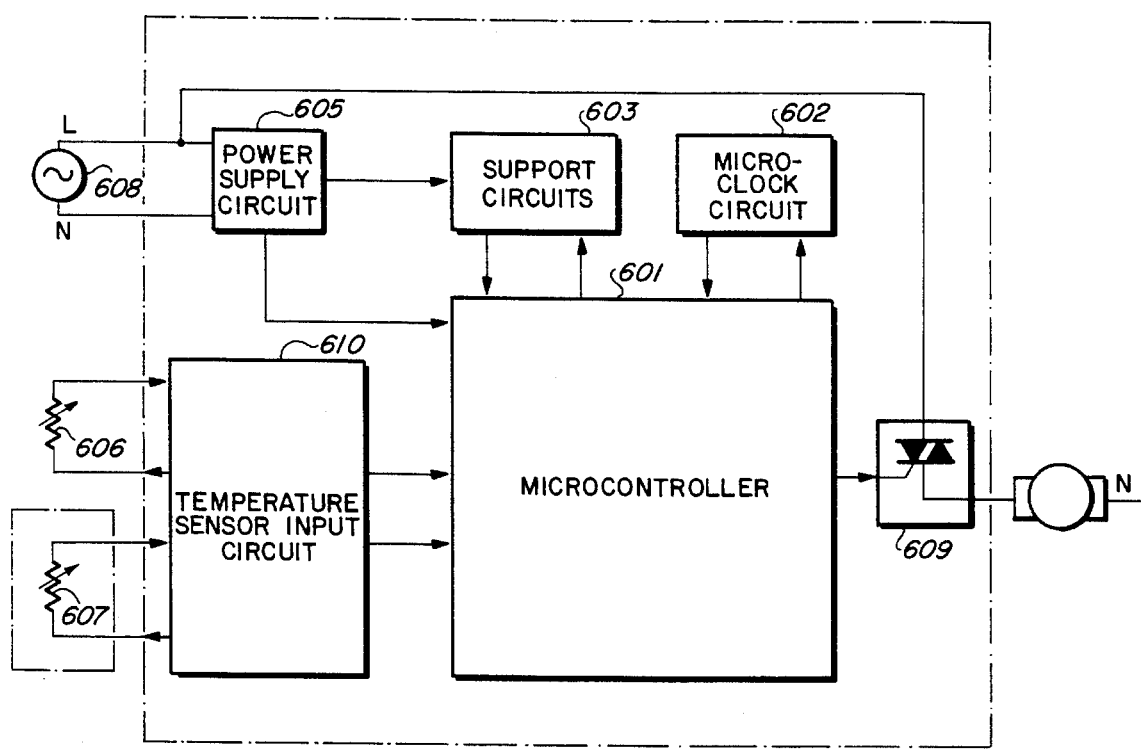
FIG. 6 is a block diagram of an appliance equipped with a method of determining ambient air temperature outside of the appliance.

These reference points of 0° C. refrigerator temperature with a room temperature of 25° C. and 0° C. provide all the necessary reference points for the microcontroller as shown in some detail in FIGS. 3 and 4. Since the four kinds of internal temperature correlate to external temperatures of the refrigerator, it is possible to utilize such time to compare to future time data taken in the refrigerator which is inside a room of unknown external temperature. In this manner, the four references are used as endpoints which al low useful intermediate times. Thus, the unknown room temperature is determinable based on the reference times and their corresponding reference external temperatures, In accordance with the teachings of the present invention, in a refrigerator with unknown external temperatures, time data may be taken during repeated periods. This data is not required 100% of the time of the operation of the refrigerator. During the time the data is not taken, the microcontroller can be utilized to learn the external temperature to adjust the operation of the compressor within the refrigerator. It is also possible to make temperature compensation in the refrigerator compartment, defrost calculations, energy efficiency improvements, or temperature changes to other compartments, such as freezer compartment 102, which are also in the same room as the refrigerator. Operation is based on a simple algorithm decision which is shown in FIG, 5 taken in connection with the equipment shown in block diagram in FIG. 6.

Figure 5:
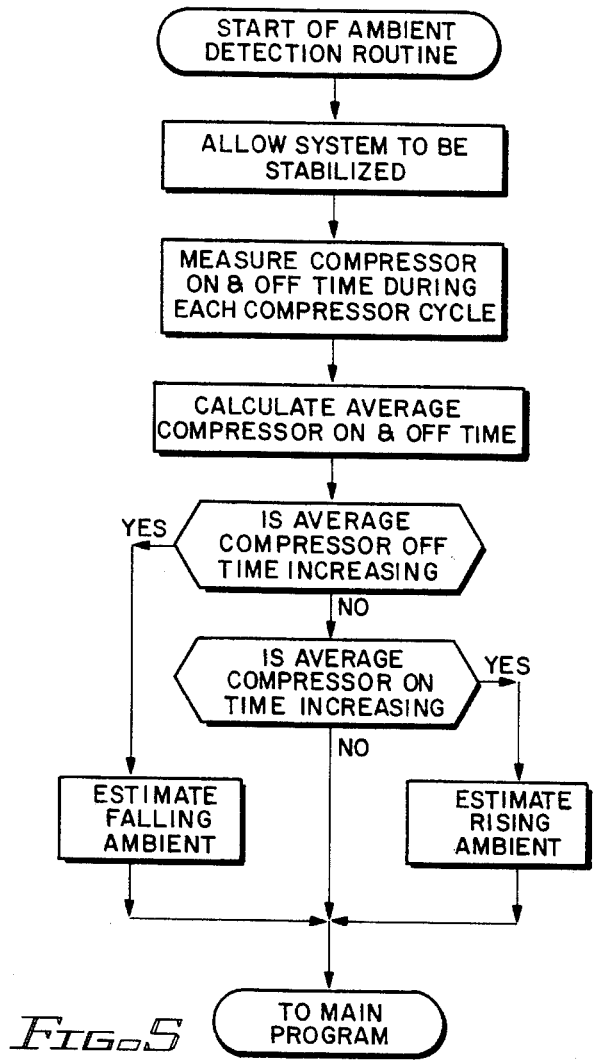
FIG. 5 is a flow chart illustrating the basic software decisions employed in the present invention.
Figure 2:
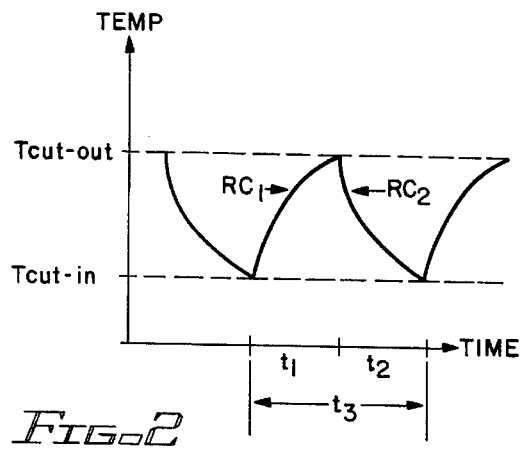
FIG. 2 is a drawing showing the effect of timers temperature.

It should be understood that while the operational elements of the present system have been shown in block diagram form, details thereof do not form a portion of the invention, rather it only being required that the individual elements of the system perform in the manner which will be described hereinafter. Such operations all being well known and within the scope of those skilled in the art, Referring now to FIGS. 5 and 6 in combination. Discussion of a software routine for determining the ambient temperature will be discussed. Initially, the system is the off and on times of the allowed to stabilize after which compressor 604 are measured by the microcontroller 601. This operation is done during each compressor cycle. Based on the aforementioned measurements, microcontroller 601 will calculate the average compressor on and off times. At this point, a determination is made as to whether the average compressor off time is increasing or decreasing. If the average compressor off time is increasing, it is then possible for the microcontroller at this point to estimate that a falling ambient temperature is present, after which the system can return to its principal or main program of operating to provide the necessary cold for the refrigerator.

If, on the other hand, the average compressor off time is not increasing, a further determination is made as to whether or not the average compressor on time is increasing. If the average on time of the compressor is increasing, microcontroller 601 will then proceed to provide an estimate of a rising ambient temperature. If average compressor on time is not increasing, and the average compressor off time is not increasing, the main program will be returned to and it can be concluded that there is neither a rising nor falling ambient temperature.

An example of the foregoing can be seen in FIG. 4, cycle 1. Data is taken on a refrigerator while at a room temperature of 13° C. Data may be taken utilizing a number of different devices. As can be seen in FIG. 4, at an outside temperature of 13° C., the compressor cycles on and off at times of 14, 8 and 23 minutes for the inside temperature settings of normal, warm and cold. The same settings are checked again with the room temperature changed to 33° C. to determine that at that temperature the cycle times are 74, 68 and 83 minutes, respectively.

Accordingly, these times may be plugged into a graph and equations are made which match these six points. The rest of the time/temperature correlation for external temperature is derived from this graph (or equations or tables) dependent thereon and placed into memory of the microcontroller. Microcontroller 601 is now connected to sensor 607, which is placed inside the refrigerator with the same mechanical size. When this refrigerator is placed in a room of unknown temperature and its settings are set to normal, as called for in cycle 1, near the bottom of FIG. 4, the microcontroller measures the times for the compressor to cycle on and off. It determines, or averages these times at 20 minutes. From the equations or tables within the microcontroller 601, it is determined that the room temperature is 15° C. During the next measurement period, the time comes out to 32 minutes and accordingly a room temperature of 19° C. is determined or inferred. Thus, effectively the microcontroller 601 is able to determine that room temperature has changed based on the determined readings.

While but a single form of the present invention has been shown, it will be obvious to those skilled in the art that numerous modifications may be made without departing from the spirit of the present invention which shall be limited only by the scope of the claims appended hereto.

What is claimed is:

1. A method of establishing a program for determining the ambient temperature of air in an area surrounding an appliance, including a cold producing element, said method comprising the steps of:

establishing a first interior temperature set point for said appliance;

establishing a first exterior ambient temperature for said appliance;

establishing a second exterior ambient temperature for said appliance;

measuring first, the on and off times of said cold producing element for said first internal temperature set point and said first external ambient temperature condition;

measuring second, the on and off times of said cold producing element for said second internal temperature set point and said first external ambient temperature condition;

measuring third, the on and off times of said cold producing element for said first internal temperature set point and said second external ambient temperature condition;

measuring fourth, the on and off times of said cold producing element for said second internal temperature set point and said second external ambient temperature condition;

calculating from said first, second, third and fourth measurements, the average on times of said cold producing element for each of said measurements;

calculating the average off times of said cold producing element from said first, second, third and fourth measurements for each of said measurements;

establishing a graph and supporting equations based on the above average calculated on and off times to facilitate the determination of ambient temperatures in environments where the exterior temperature is not controlled.

2. A method of determining the ambient temperature of an area surrounding an appliance as claimed in claim 1 wherein:

the step of determining that the average on and off times of said cold producing element determines said average on and off times are not increasing;

providing an indication to said cold producing element that said ambient air temperature is not changing.

3. A method of determining the ambient temperature of an area surrounding an appliance as claimed in claim 1 wherein:

said cold producing element is a compressor.

4. A method of determining the ambient temperature of an area surrounding an appliance as claimed in claim 1 wherein:

said measuring step is performed by a microcontroller.

5. A method of determining the ambient temperature of an area surrounding an appliance as claimed in claim 1 wherein:

said calculating step is performed by a microcontroller.

6. A method of determining the ambient temperature of an area surrounding an appliance as claimed in claim 1 wherein:

said determining step is performed by a microcontroller.

7. A method of determining the ambient temperature of air in an area surrounding an appliance including a cold producing element said method comprising the steps of:

measuring the on times of said cold producing element;

measuring the off times of said cold producing element;

calculating the average on time of said cold producing element;

calculating the average off time of said cold producing element;

determining whether the average off time is decreasing;

determining whether the average on time is increasing;

determining an indication of a rising ambient temperature based on the presence of an increase in the on times of said cold producing element;

providing said indications of ambient temperature changes to said appliance to further control said cold producing element.

8. A method of determining the ambient temperature of air in an area surrounding an appliance as claimed in claim 7 wherein:

the step of determining the average on time of said cold producing element determines said on time is increasing provides an indication to said cold producing element that said ambient temperature is falling.

9. A method of determining the ambient temperature of an area surrounding an appliance as claimed in claim 7 wherein:

said cold producing element on time is increased in response to a determination of a higher ambient temperature.

10. A method of determining the ambient temperature of air in an area surrounding an appliance including a cold producing element said method comprising the steps of:

measuring the on times of said cold producing element;

measuring the off times of said cold producing element;

calculating the average on time of said cold producing element;

calculating the average off time of said cold producing element;

determining whether the average off time is increasing;

determining whether the average on time is decreasing;

determining an indication of a falling ambient temperature based on the presence of an decrease in the on times of said cold producing element;

providing said indications of ambient temperature changes to said appliance to further control said cold producing element.

11. A method of determining the ambient temperature of air in an area surrounding an appliance as claimed in claim 10 wherein:

the step of determining the average off time of said cold producing element determines said off time is increasing provides an indication to said cold producing element that said ambient temperature is falling.

12. A method of determining the ambient temperature of an area surrounding an appliance as claimed in claim 10 wherein:

said cold producing element off time is increased in response to a determination of a lower ambient temperature.

* * * * *